US006584999B2

(12) United States Patent
Inayama et al.

(10) Patent No.: US 6,584,999 B2
(45) Date of Patent: Jul. 1, 2003

(54) FLUID PRESSURE CONTROLLER

(75) Inventors: Naoto Inayama, Kasukabe (JP); Tohru Inohara, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 80 days.

(21) Appl. No.: 09/956,981

(22) Filed: Sep. 21, 2001

(65) Prior Publication Data

US 2002/0036013 A1 Mar. 28, 2002

(30) Foreign Application Priority Data

Sep. 22, 2000 (JP) ........................................ 2000-288694

(51) Int. Cl.[7] .............................................. G05D 16/20
(52) U.S. Cl. ................. 137/487.5; 137/102; 137/116.3; 137/488; 251/26; 251/30.01
(58) Field of Search ............................... 137/102, 116.3, 137/488, 487.5; 251/26, 27, 30.01, 129.02; 60/403

(56) References Cited

U.S. PATENT DOCUMENTS

| 3,654,837 | A | * | 4/1972 | Knapp ........................... 91/461 |
| 4,253,480 | A | * | 3/1981 | Kessel et al. ................. 137/102 |
| 4,476,678 | A | * | 10/1984 | Hall ............................. 60/404 |
| 4,951,705 | A | * | 8/1990 | Carey et al. .............. 137/487.5 |
| 4,961,441 | A | * | 10/1990 | Salter ....................... 137/487.5 |
| 5,047,965 | A | * | 9/1991 | Zlokovitz .................... 137/487 |
| 5,443,087 | A | * | 8/1995 | Myles ........................ 137/102 |
| 5,460,196 | A | * | 10/1995 | Yonnet ..................... 137/487.5 |
| 5,586,575 | A | * | 12/1996 | Bergamini et al. .......... 137/488 |
| 6,305,401 | B1 | * | 10/2001 | Uehara et al. .............. 137/102 |

FOREIGN PATENT DOCUMENTS

JP 2589424 12/1996

OTHER PUBLICATIONS

Note: Partial translation in the form of an English Abstract or corresponding Japanese Laid–Open application (5–158552 A) is attached.

* cited by examiner

Primary Examiner—Michael Powell Buiz
Assistant Examiner—Ramesh Krishnamurthy
(74) Attorney, Agent, or Firm—Paul A. Guss

(57) ABSTRACT

A fluid pressure controller has an air supply valve plug displaceable under an action of pilot pressure of a pilot chamber. When the air supply valve plug is seated on a seat section, fluid communication between a supply port and a regulator port is interrupted. Further, the fluid pressure controller has a solenoid valve. When electric power supply to the solenoid valve is interrupted, the solenoid valve is opened to generate pilot pressure applied to the air supply valve plug by the original pressure of pressurized fluid introduced from the pressurized fluid supply source to the supply port.

6 Claims, 3 Drawing Sheets

FLUID PRESSURE CONTROLLER

BACKGROUND OF THE INVENTION

1. Field of the Invention

The present invention relates to a fluid pressure controller for supplying fluid pressurized at a regulated pressure to a fluid pressure apparatus such as a cylinder which is operated by the power of fluid pressure.

2. Description of the Related Art

For example, a pressure control valve as this type of fluid pressure controller is disclosed in Japanese Patent Publication No. 2589424, and the disclosures of which are herein incorporated by reference. As shown in FIG. 3, the pressure control valve 1 is provided with a main valve 3 for regulating the pressure of pressurized fluid supplied from a first pressurized fluid supply source 2. The opening degree of the main valve 3 is controlled by pilot pressure generated by an air supply solenoid valve 4a and an air discharge solenoid valve 4b. The air supply solenoid valve 4a and the air discharge solenoid valve 4b are controlled (turned on and turned off) by control signals outputted from a control circuit 5. A pressure sensor 6 detects the pressure of the fluid regulated by the main valve 3 and outputs a detection signal to the control circuit 5. The control circuit 5 performs a feedback control based on the detection signal.

A solenoid valve (three-way valve) 7 is provided between the air supply solenoid valve 4a and the air discharge solenoid valve 4b, and a pilot chamber (not shown) of the main valve 3. A second pressurized fluid supply source 9 is connected to the solenoid valve 7 via a pressure reducing valve 8.

In the conventional pressure control valve 1, since the solenoid valve 7 is provided between the air supply solenoid valve 4a and the air discharge solenoid valve 4b, and the pilot chamber of the main valve 3, when electric power supply to the pressure control valve is stopped, fluid communication between the air supply solenoid valve 4a and the air discharge solenoid valve 4b, and the pilot chamber is interrupted. Therefore, it is possible to regulate the pilot pressure in the pilot chamber of the main valve at an arbitrary pressure by the pressure reducing valve 8 provided externally to the main valve 3.

In the conventional pressure control valve 1, the external pressure reducing valve 8 regulates the pilot pressure in the pilot chamber of the main valve 3. Therefore, piping operations for providing a fluid communication passage A between the second pressurized fluid supply source 9 and the pressure reducing valve 8, and a fluid communication passage B between the pressure reducing valve 8 and the pressure control valve 1 are necessary.

Further, in the conventional pressure control valve 1, two pressure fluid supply sources (the first pressurized fluid supply source 2 and the second pressurized fluid supply source 9) are required. Additionally, the pressure reducing valve 8 is required. Therefore, many components are required in the system and the production cost thereof is high.

SUMMARY OF THE INVENTION

A general object of the present invention is to provide a fluid pressure controller for regulating fluid at a pressure substantially equal to an original pressure of a pressurized fluid supply source so as to provide a pilot pressure for a valve plug when electric power supply is stopped for some reasons.

A principle object of the present invention is to provide a fluid pressure controller which requires less piping operations and components in comparison with the conventional fluid pressure controller.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An embodiment of the present invention will be described with reference to accompanying drawings.

Figure 1:
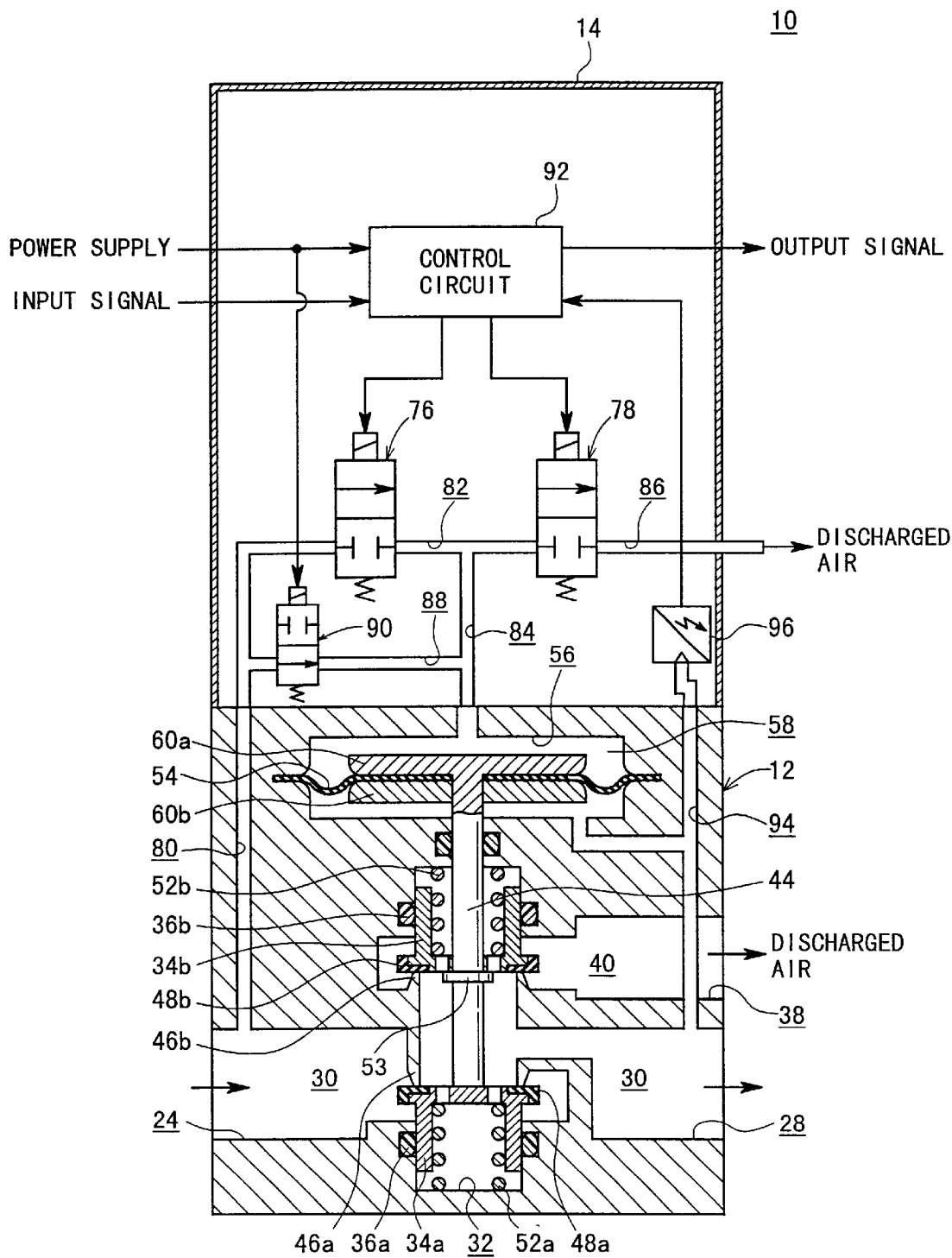
FIG. 1 is a vertical cross sectional view schematically showing a fluid pressure controller according to an embodiment of the present invention.

In FIG. 1, the reference numeral 10 denotes a fluid pressure controller according to the embodiment of the present invention.

The fluid pressure controller 10 basically comprises a body 12 having a substantially rectangular parallel-piped shape, and a cover 14 integrally connected to the top of the body 12. The body 12 and the cover 14 function as a housing.

A supply port 24 and regulator port 28 are coaxially provided in the body 12 at a predetermined spacing distance. As described later on, the fluid supply port 24 is connected to a pressurized fluid supply port 22 and the regulator port 28 is connected to an apparatus operated under fluid pressure (cylinder 26). A fluid communication passage 30 is provided between the supply port 24 and the regulator port 28 for fluid communication between the supply port 24 and the regulator port 28.

A recess 32 communicating with the fluid communication passage 30 is provided at a lower part of the body 12. An air supply valve plug 34a as described later on is vertically (upwardly and downwardly) slidably disposed in the recess 32. Further, a seal member 36a in sliding contact with an outer circumferential surface of the air supply valve plug 34a is disposed in an annular groove defined in an inner wall surface of the recess 32.

A chamber 40 communicating with atmospheric air via a discharge port 38 is provided substantially at a central part of the body 12. An elongated rod member 44 extends vertically in the chamber 40. An end of the rod member 44 abuts against an upper part of the air supply valve plug 34a. A seal member 48a is attached to an upper outer circumferential surface of the air supply valve plug 34a. The seal member 48a is formed of a resilient material such as rubber and functions as a seal when the seal member 48a is seated on a valve seat 46a.

The air supply valve plug 34a is constantly biased toward the valve seat 46a by the spring force of a spring member 52a. When the air supply valve plug 34a is seated on the valve seat 46a, the fluid communication between the supply port 24 and the regulator port 28 is interrupted. The rod member 44 pushes the air supply valve plug 34a downwardly in opposition to the spring force of the spring member 52a. When the air supply valve plug 34a is unseated (spaced) from the valve seat 46a, the fluid communication between the supply port 24 and the regular port 28 is established. An air discharge valve plug 34b is disposed around the middle portion of the rod member 44 linearly symmetrically with the air supply valve plug 34a. Since the air discharge valve plug 34b has substantially the same structure as the air supply valve plug 34a, and description thereof is omitted.

The air discharge valve plug 34b is secured to the rod member 44 by a ring 53 attached to an outer circumferential surface of the rod member 44. Therefore, when the rod member 44 is displaced upwardly in opposition to the spring force of the spring member 52b, the air discharge valve plug 34b is displaced in unison with the rod member 44 and unseated (spaced) from a valve seat 46b. When the air discharge valve plug 34b is unseated from the valve seat 46b, pressurized fluid from the regulator port 28 is discharged to the outside via the discharge port 38.

A diaphragm 54 is provided in a recess 56 defined in an upper part of the body 12. The outer peripheral edge of the diaphragm 54 is fitted in a groove defined in the inner wall surface of recess 56. Thus, the diaphragm 54 and the upper part of the recess 54 define a pilot chamber 58. The diaphragm 54 is sandwiched between a pair of disk members 60a and 60b. The central portion of the upper disk member 66a is formed integrally with the rod member 44.

Therefore, the diaphragm 54, the pair of disk members 60a and 60b, and the rod member 44 are displaced vertically together under an action of the pressurized fluid supplied in the pilot chamber 58.

An air supply solenoid valve 76 and an air discharge solenoid valve 78 are disposed at a predetermined spacing distance in the cover member 14. The air supply solenoid valve 76 and the air discharge solenoid valve 78 are normal close type two-way valves. Pressurized fluid is supplied from a pressurized fluid supply source 22 to the air supply solenoid valve 76 via a first passage 80 communicating with the supply port 24. A second passage 82 is provided between the air supply solenoid valve 76 and the air discharge solenoid valve 78. A third passage branches 84 from the second passage 82 to the pilot chamber 58 for fluid communication between the air supply solenoid valve 76 and the air discharge solenoid valve 78, and the pilot chamber 58. The air discharge solenoid valve 78 is connected to a discharge passage 86 communicating with the atmospheric air. The pressurized fluid can be discharged to the outside via the discharge passage 86.

A fluid communication passage 88 is provided between the first passage 80 and the third passage 84, and a solenoid valve 90 is provided in the fluid communication passage 88. When supply of the electric power to the solenoid valve 90 is interrupted, the solenoid valve 90 supplies pressurized fluid introduced from the supply port 24 to the pilot chamber 58. The solenoid valve 90 is a normal open type two-way valve and directly connected to an unillustrated power supply connector of the fluid pressure controller 10. The solenoid valve 90 has substantially the same structure as the air discharge solenoid valve 76 and air discharge solenoid valve 78.

When the fluid pressure controller 10 is turned on, the electric power is supplied to the solenoid valve 90. Thus, the solenoid 90 valve is opened. Therefore, in the normal condition in which the fluid pressure controller is turned on, an unillustrated valve plug of the solenoid valve 90 closes the fluid communication passage 88.

As described above, the fluid communication passage 88 communicates with the third passage 84. Alternatively, it is possible to provide the fluid communication passage 88 such that the fluid communication passage 88 directly communicates with the pilot chamber 58.

The air supply solenoid valve 76 functions as an air supply valve for controlling the pilot pressure of the pilot chamber 58. The air discharge valve 78 functions as an air discharge valve for discharging pressurized fluid supplied to the air supply solenoid valve 76 to the outside. A control circuit 92 outputs current signals (pulse signals) to electromagnetic coils (not shown) of the respective air supply solenoid valve 76 and the air discharge solenoid valve 78, for turning on and off the air supply solenoid valve 76 and the air discharge solenoid valve 78.

A pressure sensor 96 is provided in the cover member 14. The pressure sensor 96 detects the pressure of pressurized fluid flowing in a feedback passage 94 communicating with the regulator port 28, i.e., the pressure to be supplied to a fluid pressure apparatus. The pressure sensor 96 outputs a detection signal to an electric circuit board (not shown) and the control circuit 92 having connectors or the like. The control circuit 92 compares a predetermined fluid pressure and a fluid pressure corresponding to the detection signal for performing a feedback control such that the fluid flowing in the feedback passage 94 is regulated at the predetermined fluid pressure.

Specifically, the control circuit 92 outputs a control signal from its connector (not shown) for turning on and off the air supply solenoid valve 76 and the air discharge solenoid valve 78, thereby controlling the pilot pressure of the pilot chamber 58 via the third passage 84.

The fluid pressure controller 10 according to the embodiment of the present invention is constructed as described above. Next, operations and effects of the fluid pressure controller 10 will be described.

Figure 2:
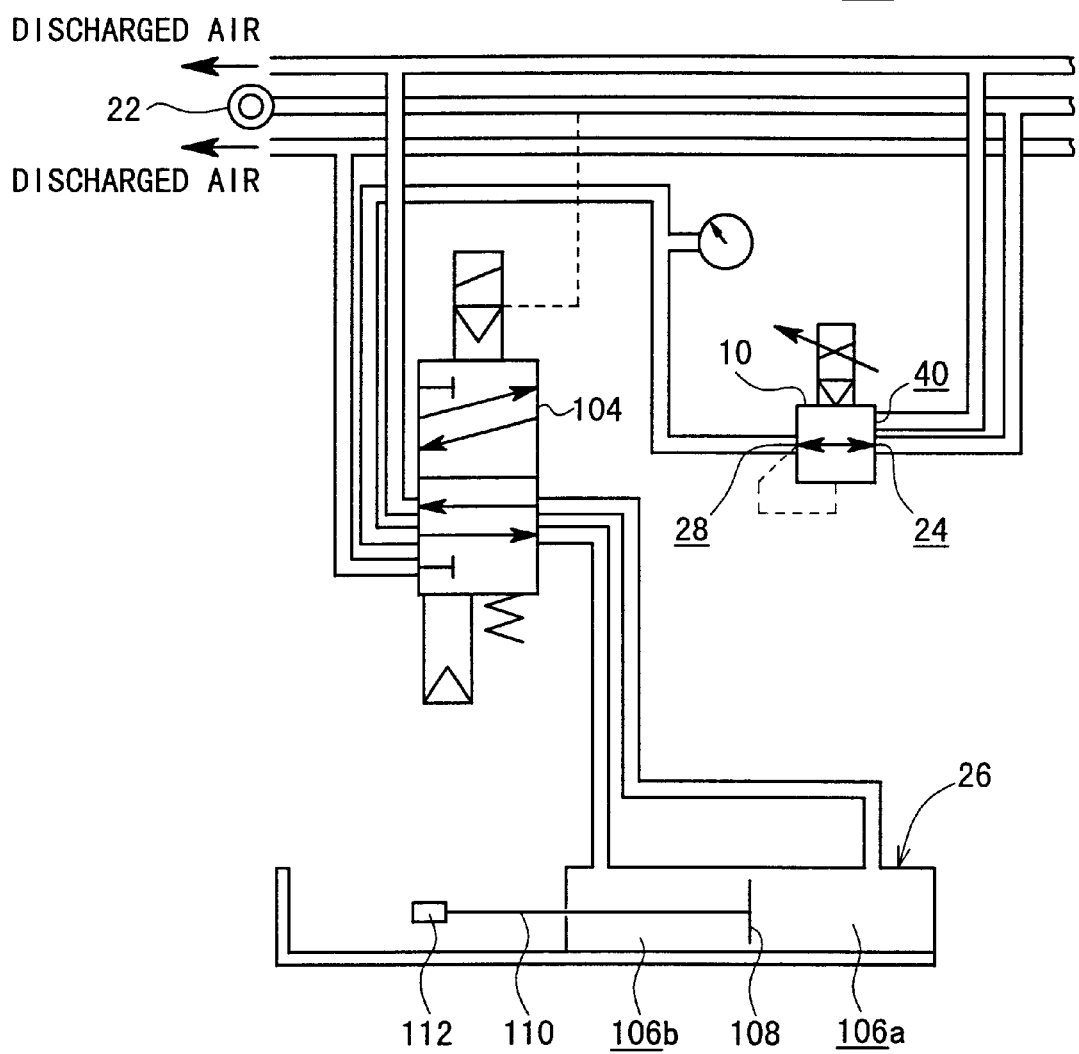
FIG. 2 is a circuit diagram schematically showing a circuit arrangement of a welding system comprising the fluid pressure controller shown in FIG. 1.
Figure 3:
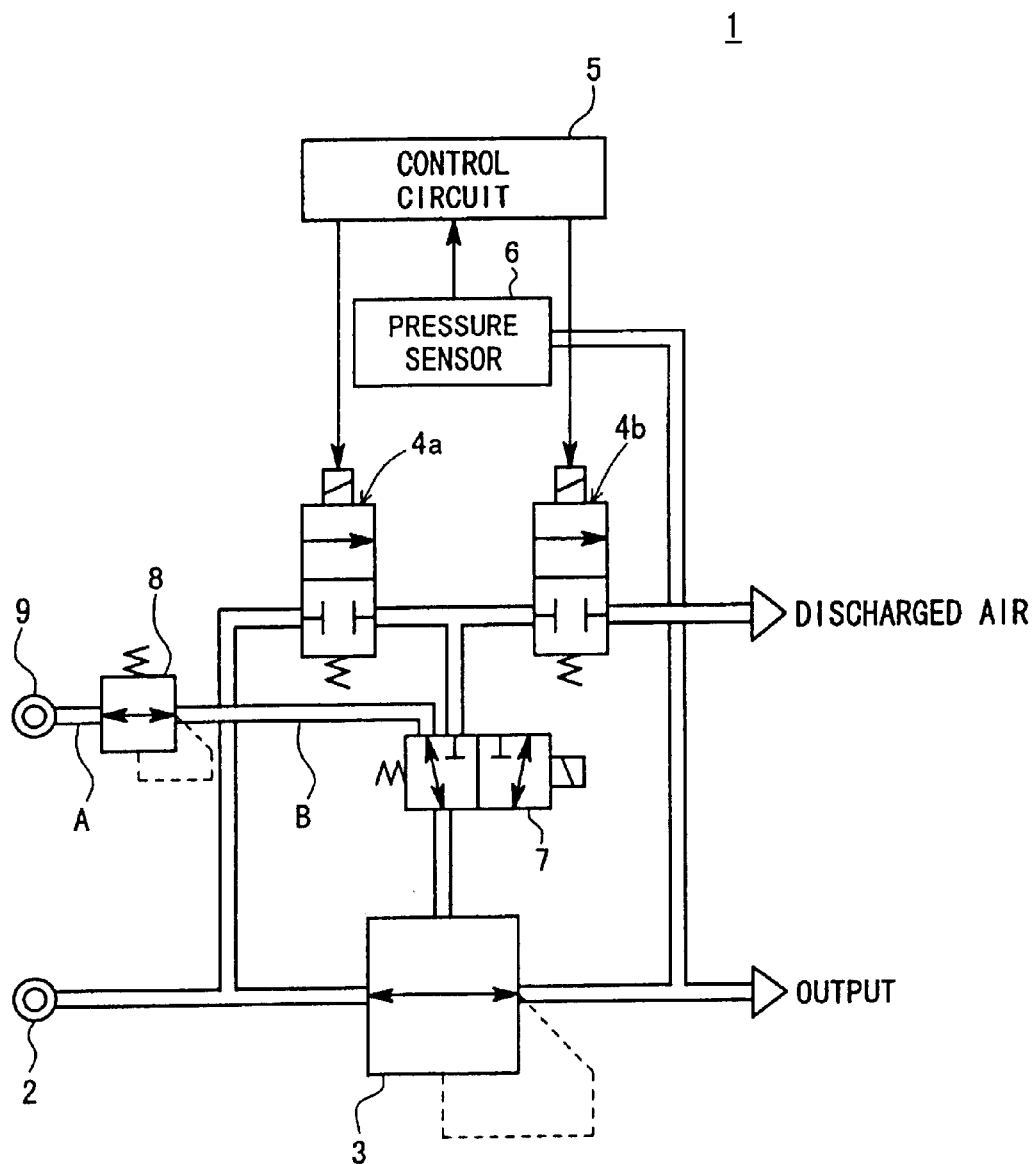
FIG. 3 is a circuit diagram schematically showing a circuit arrangement of a conventional pressure control valve.

FIG. 2 schematically shows a circuit diaphragm of a welding system 100, for example, in which the fluid pressure controller 10 according to the present embodiment is applied.

The welding system 100 comprises a pressurized fluid supply source 22 connected to the supply port 24 of the fluid pressure controller 10, a 5 port 2 position directional control solenoid valve 104 connected to the regulator port 28, a cylinder 26 having cylinder chambers 106a and 106b, and a welding gun 112. Pressurized fluid is supplied to the cylinder chamber 106a or 106b so that a piston 108 linearly reciprocates in the cylinder 26. The welding gun 112 is connected to an end of a piston rod 110 of the cylinder 26 and used for welding a workpiece (not shown).

It is assumed that the fluid pressure controller 10 has an initial position in which the fluid pressure controller 10 is turned on and the fluid supply valve plug 34a is seated on the valve seat 46a as shown in FIG. 1. When the fluid pressure controller 10 is turned on, the electric power is supplied to the solenoid valve 90. Thus, the valve plug of the solenoid valve 90 closes the fluid communication passage 88. Further, the electric power is supplied to the directional control solenoid valve 104 and the directional control solenoid valve 104 is switched from the OFF state (lower position shown in FIG. 2) to the ON state (upper position shown in FIG. 2).

In the initial position as shown in FIG. 1, pressurized fluid is supplied from the pressurized fluid supply source 22 to the supply port 24. The pressurized fluid supplied to the supply port 24 is introduced into the air supply solenoid valve 76 and the air discharge solenoid valve 78 via the first passage 80. The control circuit 92 outputs a control signal (ON/OFF signal) for turning on and off the air supply solenoid valve 76 and/or the air discharge solenoid valve 78 to regulate the pilot pressure is at a predetermined pressure.

The pilot pressure of the pilot chamber 58 defined above the diaphragm 54 is controlled by the air supply solenoid valve 76 and/or the air discharge solenoid valve 78 via the third passage 84. Thus, the diaphragm 54, the pair of disk members 60a and 60b, and the rod member 44 are integrally displaced downwardly under the action of the pilot pressure. When the rod member 44 is displaced downwardly, the air supply valve plug 34a is displaced downwardly in opposition to the spring force of the spring member 52a. As a result, the seal member 48a is spaced from the valve seat 46a.

Therefore, the pressurized fluid supplied to the supply port 24 is regulated at a predetermined reduced pressure through a clearance between the seal member 48a attached to the air supply valve plug 34a and the seat section 46a, and discharged from the regulator port 28. Then, the discharged pressurized fluid is supplied into the cylinder chamber 106a via the directional control valve 104 for displacing the welding gun 112 toward the unillustrated workpiece. The pressure sensor 96 detects the pressure of the pressurized fluid flowing through the feedback passage 94, i.e., the pressure of the pressurized fluid supplied to the cylinder chamber 106a of the cylinder 26. The control circuit 92 performs a feedback control based on the detection signal outputted from the pressure sensor 96.

As described above, the diaphragm 54 and the rod member 44 are displaced together vertically by the pilot pressure (the pressure of the pressurized fluid supplied to the pilot chamber 58) for opening and closing the fluid supply valve plug 34a. In this manner, the pressurized fluid can be regulated at a reduced pressure.

The diaphragm 54 and the pair of disk members 60a, and 60b are pressed downwardly under the action of the pilot pressure of the pilot chamber 58. By balancing the downward pressure to the diaphragm 54 and the pair of disk member 60a and 60b, and the upward spring force of the spring member 52a, it is possible to control the fluid supply valve plug 34 to seat on and unseated from the seat section 46a. In this manner, the fluid regulated at a predetermined desirable pressure in compliance with settings (specification) of the cylinder 26 is supplied to the cylinder 26 from the regulator port 28.

The piston 108 is pressed under an action of the fluid which is regulated at the predetermined pressure and introduced into the cylinder chamber 106. Thus, the welding gun 112 connected to the piston rod 110 is displaced toward the workpiece for welding the workpiece. After the welding operation is finished, the directional control solenoid valve 104 is turned off. Thus, the pressurized fluid is supplied to the other cylinder chamber 106b for displacing the welding gun 112 away from the workpiece to the initial position.

By successively performing the above operations, it is possible to weld many workpieces effectively.

If the supply of electric power is interrupted for some reasons such as electric power failure during the welding operation, the directional control solenoid valve 104, and the air supply solenoid valve 76, the air discharge solenoid valve 78, and the solenoid valve 90 of the fluid pressure controller 10 are turned off. When the solenoid valve 90 is turned off (opened), the pressurized fluid having substantially the same pressure as the fluid pressure (original pressure) supplied from the pressurized fluid supply source 22 to the fluid pressure controller 10 via the supply port 24 is supplied to the pilot chamber 58 via the first passage 80, the solenoid valve 90, the fluid communication passage 88, and the third passage 84. Since the pilot pressure is increased, the air supply valve plug 34a is unseated from the valve seat 46a and the pressurized fluid having the original pressure is supplied to the cylinder chamber 106b via the directional control solenoid valve 104. In this manner, the welding gun 112 is swiftly displaced away from the workpiece.

As described above, when the electric power supply to the fluid pressure controller 10, the directional control valve 104, and the like are interrupted for some reasons, the pilot pressure of the pilot chamber 58 is increased to the original pressure of the fluid supplied to the supply port 24. Therefore, it is possible to stop the welding operation and swiftly move the welding gun 112 away from the workpiece to the initial position.

In the present embodiment, it is not necessary to use specially designed solenoid valves. That is, the normal solenoid valve (normal open type valve) 90 having the same structure as the air supply solenoid valve 76 and the air discharge solenoid valve 78 can be used. Therefore, simply by incorporating the additional fluid communication passage 88, it is possible to carry out the embodiment of the present invention without any significant changes in the conventional system.

Further, since the solenoid valve 90 is incorporated in the body 12 and the original pressure of the pressurized fluid supplied to the supply port is utilized, in comparison with the conventional pressure control valve 1, it is possible to manufacture the fluid pressure controller 10 with a reduced number of components at a low production cost. Further, the overall size of the fluid pressure controller 10 is reduced, and thus, a large space is not required for installing the fluid pressure controller 10.

Furthermore, if the fluid communication passage 88 for installing the solenoid valve 90 is provided to directly communicate with the pilot chamber 58, it is possible to fabricate the fluid pressure controller 10 easily and the manufacturing process can be simplified.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fluid pressure controller for supplying fluid regulated at a predetermined reduced pressure to a fluid pressure apparatus operated under fluid pressure, said fluid pressure controller comprising:

a housing having a supply port connected to a pressurized fluid supply source and a regulator port connected to said fluid pressure apparatus;

a control mechanism for controlling pilot pressure;

a valve seat;

a valve plug displaceable in said housing under an action of pilot pressure, said valve plug interrupting fluid communication between said supply port and said regulator port when seated on said valve seat; and a solenoid valve in said housing, wherein when electric power supply to said solenoid valve is interrupted, said solenoid valve is opened to generate pilot pressure applied to said valve plug by pressurized fluid introduced from said pressurized fluid supply port to the supply port.

2. A fluid pressure controller according to claim 1, wherein said solenoid valve is positioned in a fluid communication passage communicating with said supply port and a pilot chamber.

3. A fluid pressure controller according to claim 1, wherein said control mechanism comprises an air supply solenoid valve and an air discharge solenoid valve each having substantially the same structure as said solenoid valve.

4. A fluid pressure controller according to claim 1, wherein said solenoid valve is a normal open type solenoid valve, and when said fluid pressure controller is turned on, electric power supply to said solenoid valve is started and said solenoid valve is opened substantially at the same time.

5. A fluid pressure controller according to claim 3, wherein said solenoid valve is a normal open type two-way valve, and said air supply solenoid valve and said air discharge solenoid valve of said control mechanism are normal close type two-way valves.

6. A fluid pressure controller according to claim 1, wherein when electric power supply to said solenoid valve is interrupted, said solenoid valve is opened, and pressure of fluid passed through said supply port and said solenoid valve as pilot pressure has substantially the same value as pressure of pressurized fluid supplied from said pressurized fluid supply source.

* * * * *